Sept. 27, 1932.  R. J. NORTON  1,879,434
BRAKE STRUCTURE
Filed March 20, 1931    2 Sheets-Sheet 1
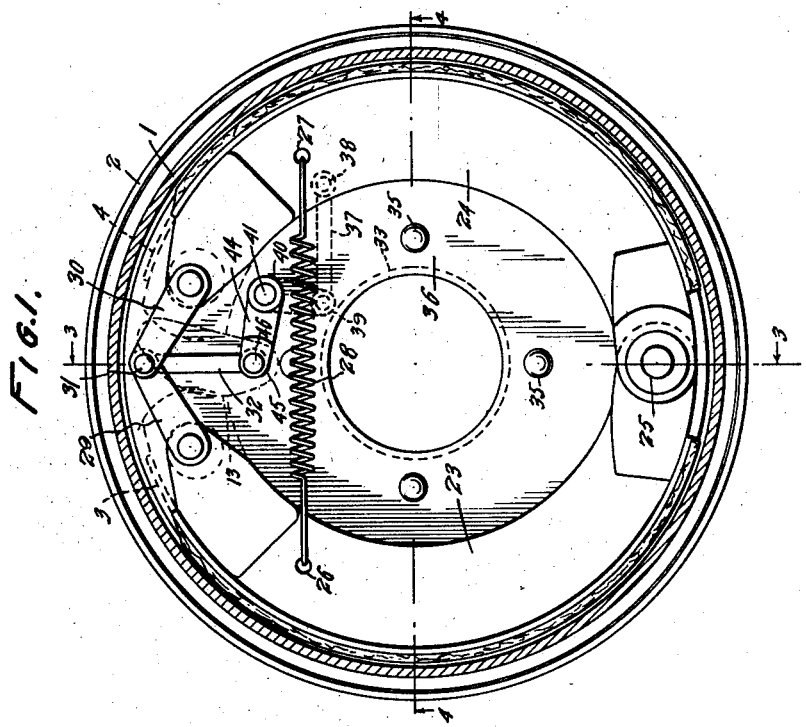
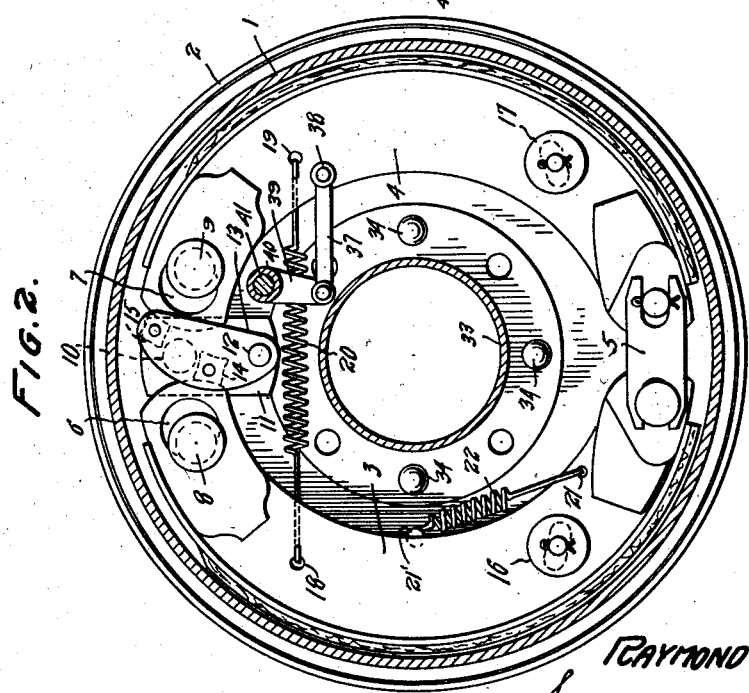
Inventor
Raymond J. Norton
By Semmes & Semmes
and M. W. McConkey
Attorney

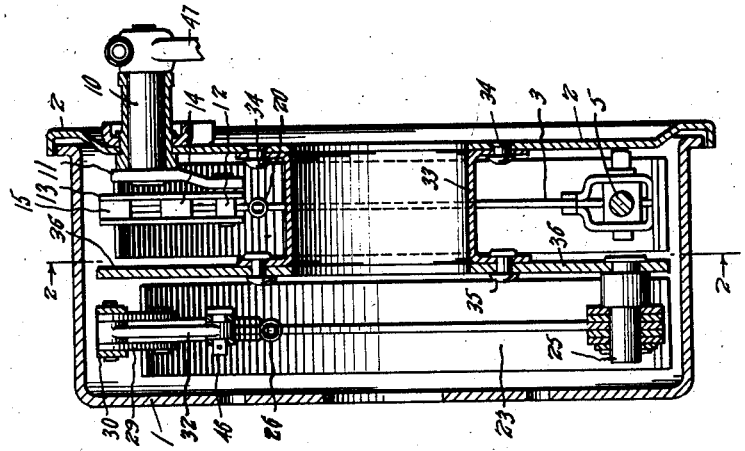

Patented Sept. 27, 1932

1,879,434

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE STRUCTURE

Application filed March 20, 1931. Serial No. 524,181.

This invention relates generally to brake structures and more particularly to an internal duplex brake.

The modern trend in the automobile industry is to produce vehicles having heavy mass. This is especially true in large busses and trucks. It is, therefore, essential that these vehicles be provided with positive acting brakes, not only capable of bringing them to a quick stop but also retarding their forward motion gradually.

Heretofore it has been customary in equipping the heavier vehicles with brakes to utilize either a single internal shoe or both an internal and an external shoe. The former has the disadvantage of not being positive enough in its action while the latter has the disadvantage of collecting dirt, moisture and the like between the drum and the brake shoe thereby decreasing its efficiency. A need is, therefore, prevalent for a brake structure having a positive braking action that can be used on vehicles of heavy mass.

An object of this invention is to provide a brake structure having internal duplex friction devices.

Another object of this invention is to provide a brake structure having duplex friction devices in which a servo action is obtained in one of the devices.

Yet another object of this invention is to provide a duplex brake structure having internal friction devices in which movement of one of the friction devices is transmitted to the other.

Still another object of this invention is to provide an internal brake structure which is positive in action and simple in construction.

With these and other objects in view, which may be incident to my improvements, the invention consists in the parts and combination to be hereinafter set forth and claimed, with the understanding that the several necessary elements comprising my invention may be varied in construction, proportions and arrangement without departing from the spirit and scope of the appended claims.

The invention consists broadly in providing a pair of laterally spaced friction members for engaging adjacent internal surfaces of the brake drum. Each friction device comprises a plurality of brake shoes, one of which produces the well-known servo effect. Application of the brake pedal or the like will actuate the servo friction device and gradually retard the speed of the vehicle. If it is desired to more quickly retard the movement of the vehicle, the brake pedal or the like is applied with greater force. This additional force, while still operating the same friction device, will actuate the other friction device. Actuation of one friction device by the other is accomplished by means of suitable connections between a shoe of one of the devices and the shoes of the other.

In order to make my invention more clearly understood, I have shown, in the accompanying drawings, means for carrying the same into practical effect without limiting the improvements in their useful applications to the particular constructions which, for the purpose of explanation, have been made the subject of illustration.

Figure 1 is a sectional view of the brake structure, the section being taken just within the head of the brake drum.

Figure 2 is a sectional view taken along line 2—2 of Figure 3.

Figure 3 is a side view taken along line 3—3 of Figure 1.

Figure 4 is a side view taken along line 4—4 of Figure 1.

Figure 5 is a perspective view showing the connection between the two friction devices.

Referring to the figures and more particularly to Figure 2, there is shown a dual acting servo type brake structure. This structure includes a drum 1, which may be suitably attached to a wheel, and a backing plate 2 mounted on a non-rotatable part of the wheel assembly. Two brake shoes 3 and 4 are positioned within the drum 1 for engagement therewith. The brake shoes 3 and 4 are connected by means of a floating connection 5 at their lower ends.

The unconnected or upper ends of the shoes 3 and 4 are provided with slots 6 and 7 for cooperating with pins 8 and 9 secured to the backing plate 2. These slots and pins are for the purpose of positioning the shoes in an unapplied position when the brake is not in use. When the brake is applied, one or the other of the pins take up the braking thrust in a well known manner.

Passing through the backing plate 2 is a shaft 10 having a crank arm 11 mounted thereon. A mounting pin 12 is secured to the crank arm 11 for mounting a cam or floating brake operator 13. Members 14 and 15 are pivotally carried by the floating brake operator 13 for engaging the ends of the brake shoes 3 and 4. The members 14 and 15 serve as actuators for the brake shoes 3 and 4 when the cam 13 is caused to rotate by application of the brake pedal.

Brake shoe spacers 16 and 17 are provided for shoes 3 and 4. The spacers 16 and 17 are secured to the backing plate 2 and serve as steady rests for the shoes.

Apertures 18 and 19 are provided in shoes 3 and 4 for receiving a spring 20 connecting the two shoes. Another aperture 21 is provided in shoe 3 for receiving a spring 22 secured to the backing plate 2 as at 21'. The former spring is to keep the shoes 3 and 4 in an unapplied position when braking pressure is released and the latter is to prevent the servo action of shoe 3 from actuating shoe 4 through the connection 5 until after shoe 3 is annularly moved with the drum 1.

The previously described structure is the well known dual acting servo brake. The present invention utilizes the action of the servo brake to operate another brake mechanism positioned within the same drum.

The second brake mechanism is a conventional structure comprising brake shoes 23 and 24 pivotally connected by means of a pin 25. Apertures 26 and 27 are provided in shoes 23 and 24 for receiving a spring 28 connecting the two shoes. The spring 28, like spring 20, keeps the shoes 23 and 24 in an unapplied position when braking pressure is released.

The upper parts of the brake shoes 23 and 24 have pivotally connected thereto members 29 and 30. The members 29 and 30 are joined pivotally as at 31 and include at the point of juncture a member 32. The above described toggle arrangement is connected to shoe 4 of the servo brake by means of suitable coupling means, hereinafter to be described.

A sleeve 33 is secured to the backing plate 2 by means of bolts 34. Attached to the sleeve 33 by bolts 35 is an anchor plate 36.

The anchor plate 36 serves as a partition between the two friction devices and forms a support for the pin 25.

Figure 5 is a perspective view showing the coupling connections between the two friction devices. As illustrated, a link 37 is attached to the brake shoe 4 as at 38. Pivotally connected to the link 37 by means of a crank arm 39 is a rocker arm 40. The crank arm 39 may as shown be made integral with the rocker arm 40. The rocker arm 40 is adapted to be moved about a concentric member 41 acting as a shaft and is provided with a groove 42 formed by projections 43. The groove 42 receives the anchor plate 36 and lateral movement of the rocker arm 40 is prevented by the projections 43.

Integral with the other end of the rocker arm 40 is another crank arm 44 having a split end 45. The end 45 of the crank arm 44 receives the member 32 of the toggle arrangement in a pivotal connection as at 46.

The operation of the duplex brake structure will be apparent from the foregoing description. When braking pressure is applied, a cam arrangement 47 produces motion of the crank arm 11 about the shaft 10. This motion is transmitted by means of the pin 12 to the brake operator 13 which, through the member 14, actuates the brake shoe 3.

Movement of the brake shoe 3, engaging the drum 1 produces the well-known servo action resulting in a displacement of the brake shoe 4. The motion of the brake shoe 4 is transmitted through the link 37 and crank arm 39 to the rocker arm 40. The rocker arm 40 exerts a downward pull, through the crank arm 44, on the member 32 of the toggle arrangement. The downward pull is transmitted to the brake shoes 23 and 24 of the second friction device by the toggle and as a consequence positive braking action is secured by the use of two friction devices.

There is accomplished by this invention a duplex brake structure which is positive in action and which utilizes motion of one of the friction devices for actuating the other.

While I have shown the preferred embodiment of the invention, it is to be understood that this is given merely for the purpose of illustrating the underlying principle, for it is obvious that this concept may be incorporated in other specific mechanisms. Thus while the second set of shoes has been shown as being actuated by a toggle, manifestly other types of spreading means such as cams, wedges etc., may be employed. Likewise the motion of the secondary shoe of the first set is transmitted to the second set by means of a special linkage. It will be appreciated that any desired type of motion transmitting mechanism may be employed and that this mechanism may be actuated either by radial or circumferential movement of the secondary shoe of the first set or by any combination of these forces. Therefore, since many changes and variations may be made in the construction, it is to be understood that these are all comprehended within the scope of the present invention, except as specifically excluded by the appended claims.

I claim:

1. A duplex brake structure comprising in combination, a drum, a pair of friction devices arranged side by side, each friction device having a pair of shoes, a cam for actuating the shoes of one of the friction devices to produce servo action, a link connected to one of said shoes, a toggle connected to the other pair of shoes, and means for transmitting movement of the first mentioned shoes to the last mentioned shoes.

2. A duplex brake structure comprising in combination a drum, a pair of friction devices arranged side by side, each friction device having a pair of shoes, a cam for actuating the shoes of the first friction devices, to produce servo action, a link connected to one of the shoes of the first friction device, a toggle connected to the shoes of the second friction device, a rocker arm connecting the two friction devices for transmitting movement of the first mentioned shoes to the last mentioned shoes.

3. A duplex brake structure comprising, in combination, a drum, a servo acting friction device within said drum, means for operating said friction device, means for restoring the members of the friction device to an unapplied position, a second friction device within said drum, means for restoring the second friction device members to an unapplied position, a link connected to one of the members of the first friction device, a toggle connecting the members of the second friction device and means for transmitting movement of said link to said toggle to actuate the second friction device.

4. A duplex brake structure comprising, in combination, a drum, a servo acting friction device within said drum, means for operating said friction device, means for restoring the members of the friction device to an unapplied position, a second friction device within said drum, means for restoring the second friction device members to an unapplied position, a link connected to one of the members of the first friction device, a toggle connecting the members of the second friction device, and a rocker arm connected between the link and the toggle for transmitting movement of the first friction device to the second friction device.

5. A duplex brake structure comprising, in combination, a drum, a pair of laterally spaced friction devices for engaging internal adjacent surfaces of the drum, a sleeve passing through one of said friction devices, an anchor plate attached to said sleeve, and means passing through said anchor plate to transmit movement of one of the friction devices to the other.

6. A duplex brake structure comprising, in combination, a drum, a pair of laterally spaced friction devices for engaging internal adjacent surfaces of the drum, a sleeve passing through one of said friction devices, an anchor plate attached to said sleeve, a pin supported in said anchor plate for connecting the friction members of one of said friction devices and means passing through said anchor plate to transmit movement of one of the friction devices to the other.

7. A duplex brake structure comprising, in combination, a drum, a servo acting friction device within said drum and having a pair of shoes, means for operating said friction device, means for restoring the shoes of the friction device to an unapplied position, a second friction device laterally spaced from the first and having a pair of shoes, means for restoring the shoes of the second friction device to an unapplied position, an anchor plate separating the two friction devices, a sleeve passing through the first friction device and supporting said anchor plate, a pin carried by the anchor plate to pivotally connect the shoes of the second friction device and means passing through the anchor plate for transmitting movement of the first friction device to the second.

8. A duplex brake structure comprising, in combination, a drum, a servo acting friction device within said drum and having a pair of shoes, means for operating said friction device, means for restoring the shoes of the friction device to an unapplied position, a second friction device laterally spaced from the first and having a pair of shoes, means for restoring the shoes of the second friction device to an unapplied position, an anchor plate separating the two friction devices, a sleeve passing through the first friction device and supporting said anchor plate, a pin carried by the anchor plate to pivotally connect the shoes of the second friction device, a link connected to one of the shoes of the first friction device, a toggle connecting the shoes of the second friction device and means passing through the anchor plate for transmitting movement of said link to said toggle for actuating the second friction device.

9. A duplex brake structure comprising, in combination, a drum, a servo acting friction device within said drum and having a pair of shoes, means for operating said friction device, means for restoring the shoes of the friction device to an unapplied position, a second friction device laterally spaced from the first and having a pair of shoes, means for restoring the shoes of the second friction device to an unapplied position, an anchor plate separating the two friction devices, a sleeve passing through the first friction device and supporting said anchor plate, a pin carried by the anchor plate to pivotally connect the shoes of the second friction device, a link connected to one of the shoes of the first friction device, a toggle connecting the shoes of the second friction device and a rocker arm connected between the link and the toggle and passing through the anchor plate for transmitting movement of the first friction device to the second friction device.

In testimony whereof, I have hereunto signed my name.

RAYMOND J. NORTON.